Feb. 6, 1934.   G. A. LYON   1,946,168
TIRE COVER
Filed June 8, 1931    2 Sheets-Sheet 1
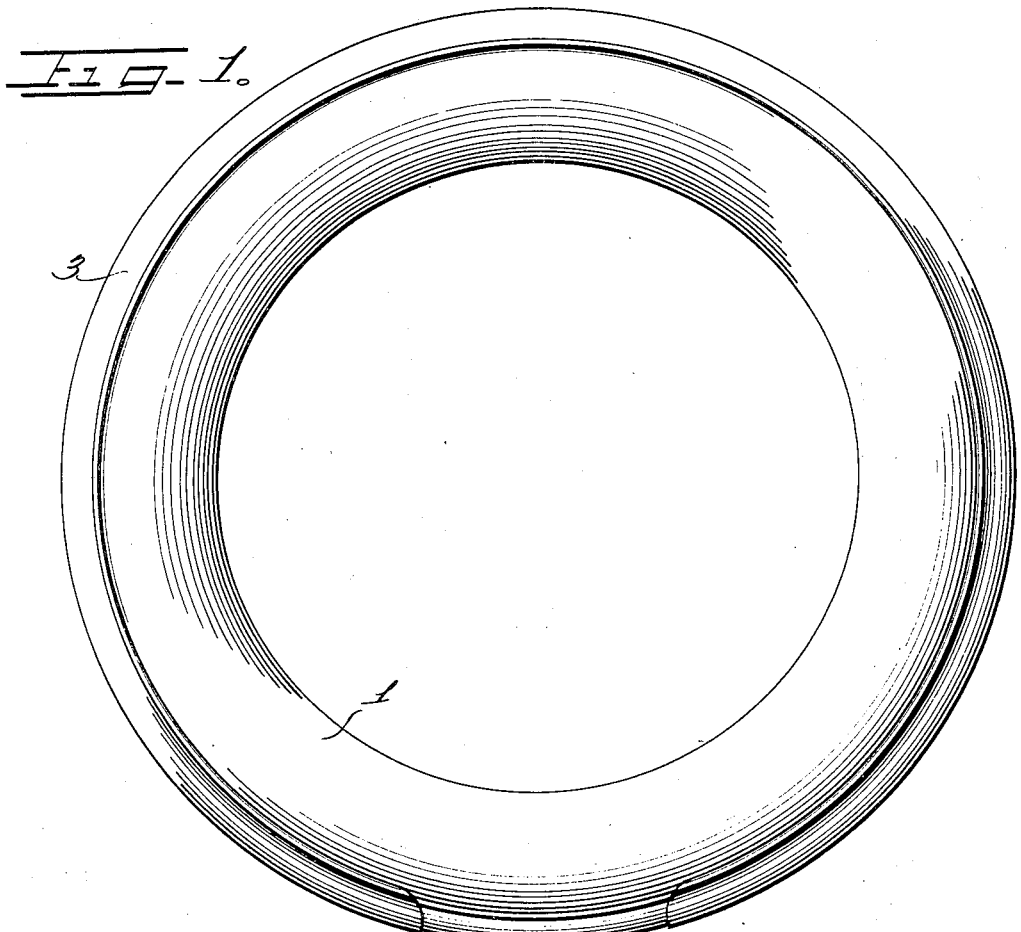
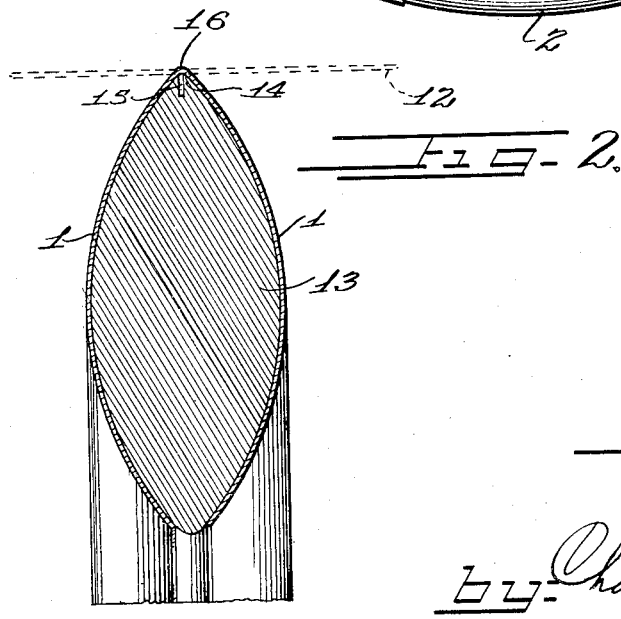
Inventor
George Albert Lyon.
by Charles T. Mills Attys.

Feb. 6, 1934.    G. A. LYON    1,946,168
TIRE COVER
Filed June 8, 1931    2 Sheets-Sheet 2

Inventor
George Albert Lyon.
by Charles O'Neill Attys.

Patented Feb. 6, 1934                                           1,946,168

UNITED STATES PATENT OFFICE 1,946,168

TIRE COVER

George Albert Lyon, Allenhurst, N. J., assignor to Lyon Incorporated, Asbury Park, N. J., a corporation of Delaware Application June 8, 1931. Serial No. 542,788

7 Claims. (Cl. 150—54)

This invention has to do with tire covers and is concerned more particularly with the method of manufacturing the side plate of a multi-part tire cover, and of finishing or trimming the edges of the tire cover parts.

In the past, in the manufacture of these side plates, it has been necessary to purchase squares of the sheet metal and then, by press operations, cut out and form the side plate which takes the shape of an annulus of considerably less material than the square of metal with which the operation is begun. As a result, the metal remaining after the annulus has been cut out must be sold for scrap and is worth very little compared to the square sheet. It is accordingly one of the principal objects of the present invention to provide a method by which the annular side plate may be formed without waste.

It is a further object of the invention to provide an improved method of shaping the side plate of a tire cover.

It is a further object of the invention to provide trimming or molding for the visible edges of the tire cover parts to not only improve the appearance thereof, but additionally to conceal any roughness caused by the original formation of such edges.

Formerly, the rubber or like bead or strip which has been employed to prevent contact between the side plate and outer ring or rim of the tire cover has been secured to the outer peripheral edge of the side plate. The side plate has therefore been provided with a peripheral bulged edge to retain the rubber strip. This has greatly complicated the fabricating of the side plate and made its manufacture quite expensive. By applying the strip to the outer ring or rim of the cover, the main difficulty of forming the side plate will be eliminated, without sacrificing the benefit of the strip.

It is accordingly a further object of the invention to provide a tire cover of this character wherein the cushioning bead is secured to an edge of the outer ring or rim of this type of tire cover and the manufacure of the side plate greatly simplified.

In carrying out the improved method of forming the side plate, a ribbon of steel is first formed as a shallow cylindrical sleeve which is positioned about a mandrel which may be in the form of a torus having a cross-section simulating an ellipse with the outer peripheral edge of the torus disposed substantially midway between the edges of the sleeve. The sleeve is then spun or rolled over and against the sides of the torus to assume the shape of the sides of the latter, which shape is predetermined and is that which is to be assumed by each side plate when it is finished. The sleeve is thereupon severed at its outer peripheral portion so that two side plates are thereby formed. One or both of the edges of each side plate may thereupon be turned upon itself to form a smooth edge, as desired. Thus no waste of metal is incurred.

Further important objects and advantages of the invention will appear as the description proceeds.

Figure 1 shows a tire cover made in accordance with the present invention and applied to a spare tire.

Figure 2 is a sectional view showing how a pair of side plates may be formed in accordance with the present invention.

Figure 3:
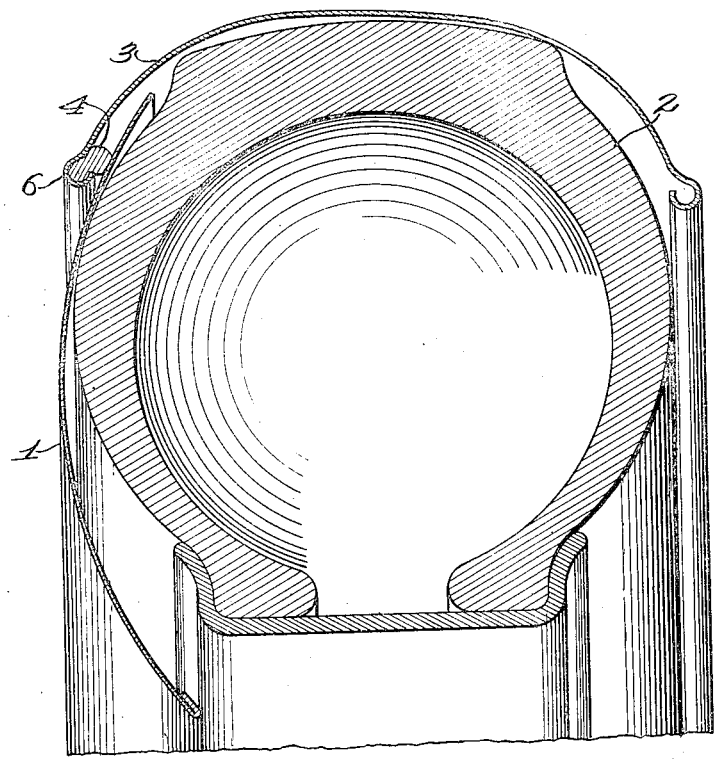
Figure 3 is an enlarged transverse sectional view of a tire cover mounted on a tire and constructed in accordance with the present invention.

Referring now more particularly to the drawings, wherein the same parts are indicated throughout by the same reference characters, the tire cover comprises a side plate 1 for covering a side wall of a tire 2, and an outer ring or rim 3. In order to prevent metal to metal contact between the parts 1 and 3 of the tire cover, a strip or bead 4 of rubber or like material is clinched in the edge of the outer ring which overlaps the side plate 1. It will be understood, of course, that in the event two side plates 1 are employed in connection with the outer ring or rim 3, both edges of the outer ring will be supplied with proper beads 4 or 5.

In the form of the invention shown in Figure 3, the bead receiving edge 6 may be formed coincidentally with the rolling operation by which the outer ring 3 is formed, or the edge 6 may be spun after such rolling operation. In either event, prior to the operation by which the bead is clinched to the edge 6, the latter will have the appearance shown in Figure 6, wherein the extremity 7 thereof will be spaced from the adjacent inner portion 8 of the edge 6 a sufficient amount to permit easy access of the bead into the recess 9. After the bead 4 is positioned in the recess 9, the extremity 7 is forced inwardly and embedded in the bead very much as shown in Figure 3, thereby firmly holding the bead in position.

Figure 4:
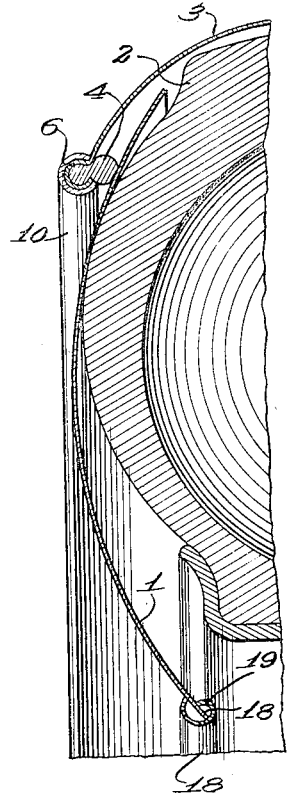
Figure 4 shows a somewhat modified tire cover construction.

Inasmuch as the outer ring 3 is generally chrome plated or made of stainless steel or similar material, the operation by which the rubber is clinched will not unduly mar the metal. However, if the outer ring is finished in enamel or the like, this clinching operation will mar the surface, in which event a stainless steel or similar split ring 10 may be rolled or snapped into position over the edge 6 as shown in Figure 4. In such event, it might first be advisable to cause the edge 6 to project laterally from the outer ring 3 as shown in Figure 4, in order that the ring 10 may fully clear the side plate to thereby avoid any likelihood of metal to metal contact. With the upper surface of the outer ring 3 finished in enamel or the like, it will be apparent that the molding or trim 10 will not only conceal the possibly marred edge 6, but will provide a pleasing contrast in the color scheme between the edge and the main body portion of the outer ring 3, thereby enhancing the attractiveness of the cover.

Figures 5, 6, 7:
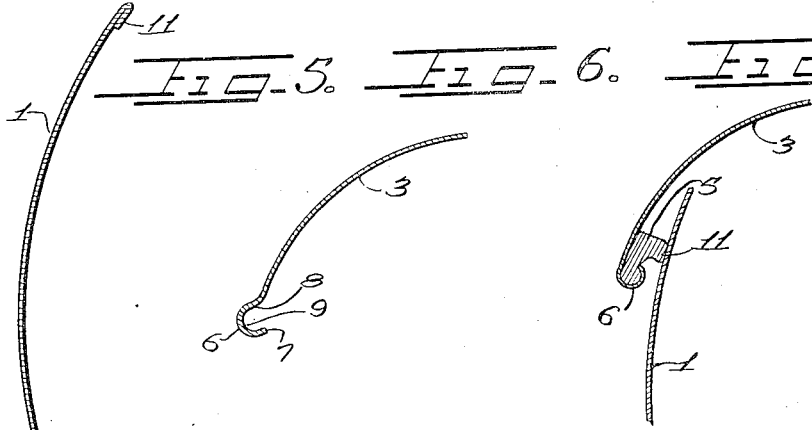
Figure 5 shows in section a side plate with both edges turned inwardly.
Figure 6 is a fragmentary sectional view showing how the rubber-bead holding edge of the outer ring appears prior to the bead-clinching operation.
Figure 7 is a fragmentary sectional view showing a still different edge construction of the outer ring.

The side plate 1 may have its edges 11 turned back upon itself as shown in Figure 5, or only one such edge may be turned upon itself as shown in Figure 3. This backward turning operation may be performed by the manufacturer who furnishes the strip steel of which the side plate is made, or in the process of forming the side plate itself.

Marring of the finish of the outer ring 3 adjacent the rubber receiving edge 6 may, if desired, be avoided by so forming the edge 6 that it does not project outwardly beyond the outer surface of the outer ring 3, but on the contrary projects inwardly thereof as seen in Figure 7. In order to insure against any contact between the edge 6 and the adjacent portion of the side plate 1, the rubber or like bead 5 is preferably initially so shaped as to provide a projecting portion 11 which adequately spaces the metal parts mentioned from each other.

The side plate has heretofore been made by a series of pressing operations from a substantially square sheet of metal, and it will be appreciated that this has involved a large amount of waste. This condition is remedied by the method to be described. In accordance with the present invention, the side plate may be formed in very few operations involving less costly machinery and tools than has heretofore been the case in the formation of the side plates from a square of metal.

While various methods may be employed in the formation of the side plates, involving operations of spinning, pressing or rolling, my preferred method is as follows:

A strip or ribbon of sheet metal of a width substantially equal to double the width of a side plate is given the form of a shallow substantially cylindrical sleeve, and the meeting ends butt-welded. The flash resulting from the welding operation is removed by grinding or the like, and the sleeve is then positioned around a mandrel which may be in the form of a torus having an elliptical cross-section, or at least having its sides shaped in accordance with the predetermined shape of the side plate of a finished tire cover. The mandrel preferably fits in the sleeve snugly, and is so positioned that its outer peripheral edge is disposed midway between the edges of the sleeve. A portion of the sleeve is shown in dotted lines in Figure 2, and is designated by the numeral 12, the mandrel being designated at 13 and its outer peripheral edge at 14. With the parts thus positioned, both sides of the sleeve 12 are rolled or spun inwardly onto and against the corresponding surfaces of the mandrel 13, to the position shown in full lines in Figure 2. The mandrel 13 has at its outer peripheral edge 14 an annular groove or slot 15, and when the parts are positioned as shown in full lines in Figure 2, a cutting tool is applied at the outer peripheral edge 16 and urged toward the slot 15 to thereby cut the sheet metal sleeve into two equal parts which constitute in effect side plates 1 for use in connection with one or a pair of tire covers.

As mentioned hereinabove, one or both longitudinal edges 11 of the side plate 1 may be turned back to eliminate roughness and sharp corners, or, if desired, the inner peripheral edge 17 may be left plain as shown in Figure 4 and received in and embellished by a strip or ring of trim or molding 18, preferably of chrome finish or stainless steel or the like. The molding 18 will serve to improve the appearance of the side plate 1 and of the cover as a whole very much as is true of the molding 10 hereinabove described. The molding 18 may be resilient and may be snapped by the edge 17, or, if desired, the inner portion 19 of the molding 18 may be formed on a radius sufficiently small to permit its passage beyond the edge 17 of the side plate 1, and may thereupon be spun or rolled against the inner surface 20 of the side plate 1 to the position shown in Figure 4.

Of course, if desired, the strip or ribbon of metal of which the side plate is formed may be of such width as to provide material for the formation of only one side plate, in which event, one side of the mandrel 13 would serve as a shaping surface. If desired, moreover, either the single or the double side plate could be formed by first rolling the flat ring or sleeve into the concavo-convex form and then welding after the rolling operation. However, it may be more practical to weld the sleeve prior to the rolling operation.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a multi-part tire cover, a tire tread embracing member having a return bent longitudinal edge, a yieldable anti-rattling strip firmly carried by said edge and projecting laterally therefrom for insulating said members from each other, and a strip of molding enclosing said edge to conceal any unsightliness resulting from the bending of said edge and at the same time enhancing the appearance of the cover.

2. A tire cover or the like having a substantially planar face ring of rigid, form sustaining material, whose inner edge is complete and substantially circular, and a molding receiving, binding, protecting and ornamenting said inner edge, comprising a channeled ring of metal or the like having its channel opening radially outwardly and being resilient to be snapped into place on said inner edge.

3. A tire cover or the like having a substantially planar face ring of rigid, form sustaining material, whose inner edge is complete and substantially circular and subject to edge splitting, and a molding receiving, binding, protecting and ornamenting said inner edge comprising a channeled ring of metal or the like having its channel opening radially outwardly and having an inherent tendency to flex as it is snapped into place on said inner edge.

4. A tire cover or the like having a substantially planar face ring of rigid, form sustaining, material, having a complete and substantially circular edge, and a molding receiving, surrounding, binding, protecting and ornamenting said edge comprising a resilient deeply channeled ring of metal or the like having its channel opening in a radial direction with the mouth of the channel radially remote from the web thereof, and having an inherent tendency to spring as it is snapped into place on and receives said edge in order to lock and secure itself on said edge by its own resiliency and the rigidity of the edge.

5. A tire cover or the like having a ring of rigid form sustaining material whose inner edge is substantially circular and a molding over said edge comprising a channeled ring of metal or the like and having an opening to receive said edge and having an inherent tendency to spring as it is snapped into place on and receives said edge in order to lock and secure itself on said edge by its own resiliency and the rigidity of the edge.

6. A tire cover or the like having a ring of rigid form sustaining material whose inner edge is substantially circular and a molding over said edge comprising a channeled split ring of metal or the like and having an opening to receive said edge and having an inherent tendency to spring as it is snapped into place on and receives said edge in order to lock and secure itself on said edge by its own resiliency and the rigidity of the edge.

7. A tire cover or the like having a ring of rigid form sustaining material whose inner edge is substantially circular and a molding over said edge comprising a channeled ring of metal or the like and having an opening to receive said edge and having an inherent tendency to spring as it is snapped into place on and receives said edge in order to lock and secure itself on said edge by its own resiliency and the rigidity of the edge, said inner edge carrying a cushioning pad comprising a ring of yieldable material disposed opposite said molding ring.

GEORGE ALBERT LYON.